United States Patent [19]
Leibowitz

[11] Patent Number: 6,003,446
[45] Date of Patent: Dec. 21, 1999

[54] KEYBOARD LAP TABLE

[76] Inventor: Marc Leibowitz, 245 E. 84th St., apt. 2E, New York, N.Y. 10028

[21] Appl. No.: 09/221,524

[22] Filed: Dec. 28, 1998

[51] Int. Cl.⁶ .................................................. A47B 23/00
[52] U.S. Cl. ............................................. 108/43; 248/918
[58] Field of Search .............................. 108/43; 248/118, 248/118.1, 444, 918

[56] References Cited

U.S. PATENT DOCUMENTS

| | | | |
|---|---|---|---|
| 399,266 | 3/1889 | Hull | 108/26 X |
| 2,255,654 | 9/1941 | Davis et al. | 248/444 |
| 4,765,583 | 8/1988 | Tenner | 248/444 |
| 4,852,909 | 8/1989 | Stoyanoff | 281/33 X |
| 5,038,688 | 8/1991 | Permenter | 108/43 |
| 5,143,341 | 9/1992 | Juster | 248/444 X |
| 5,433,407 | 7/1995 | Rice | 248/118.1 X |
| 5,628,482 | 5/1997 | Iravantchi et al. | 248/118 |
| 5,628,483 | 5/1997 | Smith et al. | 248/118 X |
| 5,655,743 | 8/1997 | Gillis | 248/346.01 X |
| 5,660,360 | 8/1997 | Yang | 248/118 X |
| 5,687,422 | 11/1997 | Wurst et al. | 2/24 X |
| 5,692,815 | 12/1997 | Murphy | 312/283 X |
| 5,730,403 | 3/1998 | Johnson | 248/118.1 |
| 5,732,910 | 3/1998 | Martin | 248/118 X |
| 5,746,403 | 5/1998 | Ambrose et al. | 248/118 |
| 5,876,002 | 3/1999 | White et al. | 248/118 |
| 5,881,976 | 3/1999 | Gutowski | 248/118.5 X |
| 5,893,540 | 4/1999 | Scott | 248/118 X |
| 5,901,934 | 5/1999 | Wilson | 248/346.01 X |

FOREIGN PATENT DOCUMENTS 155921   1/1921   United Kingdom ..................... 108/43

Primary Examiner—Lynne H. Browne
Assistant Examiner—Brian H. Buck
Attorney, Agent, or Firm—Michael I Kroll

[57] ABSTRACT

A portable work surface having a leg contoured tray 10 for being placed and used in the lap of an individual 11 for positioning a keyboard console 12 thereon and having a raised padded front portion 28 whereupon the wrists of the user 11 rest while typing. The laptop tray 10 has a recessed and retractable sideboard 14 held in place by clips 16 for placement and manipulation of a mouse 22. An additional embodiment discloses the lap tray 10 having a padded bottom 34.

8 Claims, 9 Drawing Sheets

KEYBOARD LAP TABLE

BACKGROUND OF THE INVENTION

1. Field of the Invention

The present invention relates generally to portable work surfaces and, more particularly, to a leg contoured tray situated in the lap of an individual for positioning a keyboard console thereon and having a raised padded front portion whereupon the wrists of the user rest while typing and the laptop tray has a recessed and retractable sideboard for placing and manipulating a mouse.

2. Description of the Prior Art

There are portable work surfaces which are available and while they may be suitable for the purposes for which they were designed, they would not be as suitable for the present invention as hereinafter described.

It is thus desirable to provide a leg contoured tray whereupon a keyboard console can be placed. It is further desirable to provide said contoured tray with a raised padded ridge located on the front of the contoured tray for the purposes of providing means for resting the wrist area of the arm while typing. It is still further desirable to provide said contoured tray with a recessed and retractable sideboard whereupon a pointing device can be placed for manipulation and it is still further desirable to provide an additional embodiment wherein the base of the contoured tray is covered by a padding material.

SUMMARY OF THE PRESENT INVENTION

The present invention discloses a portable work surface having a leg contoured tray for being placed and used in the lap of an individual for positioning a keyboard console thereon and having a raised padded front portion whereupon the wrists of the user rest while typing. The laptop tray has a recessed and retractable sideboard held in place by clips for placement and manipulation of a mouse. An additional embodiment discloses the lap tray having a padded bottom.

A primary object of the present invention is to provide a leg contoured lap tray whereupon a keyboard console can be placed thereby providing a more natural positioning of the arms, wrists, and hands while typing.

Another object of the present invention is to provide a leg contoured lap tray with a raised front padded ridge for resting the wrists while typing.

Yet another object of the present invention is to provide a leg contoured lap tray with a recessed and retractable sideboard whereupon a pointing device may be positioned for manipulation.

Still yet another object of the present invention is to provide a leg contoured lap tray with a clip for holding and maintaining said recessed and retractable sideboard in the user selectable desired position.

Another object of the present invention is to provide said recessed and retractable sideboard with means for holding said pointing device by providing a slot for inserting the wire of said pointing device.

Yet another object of the present invention is to provide a leg contoured lap tray wherein the leg contoured edge portion has a padding material located thereon.

Additional objects of the present invention will appear as the description proceeds.

The present invention overcomes the shortcomings of the prior art by providing a leg contoured lap tray whereupon a keyboard console and a pointing device may be positioned thereon.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

Figure 1:
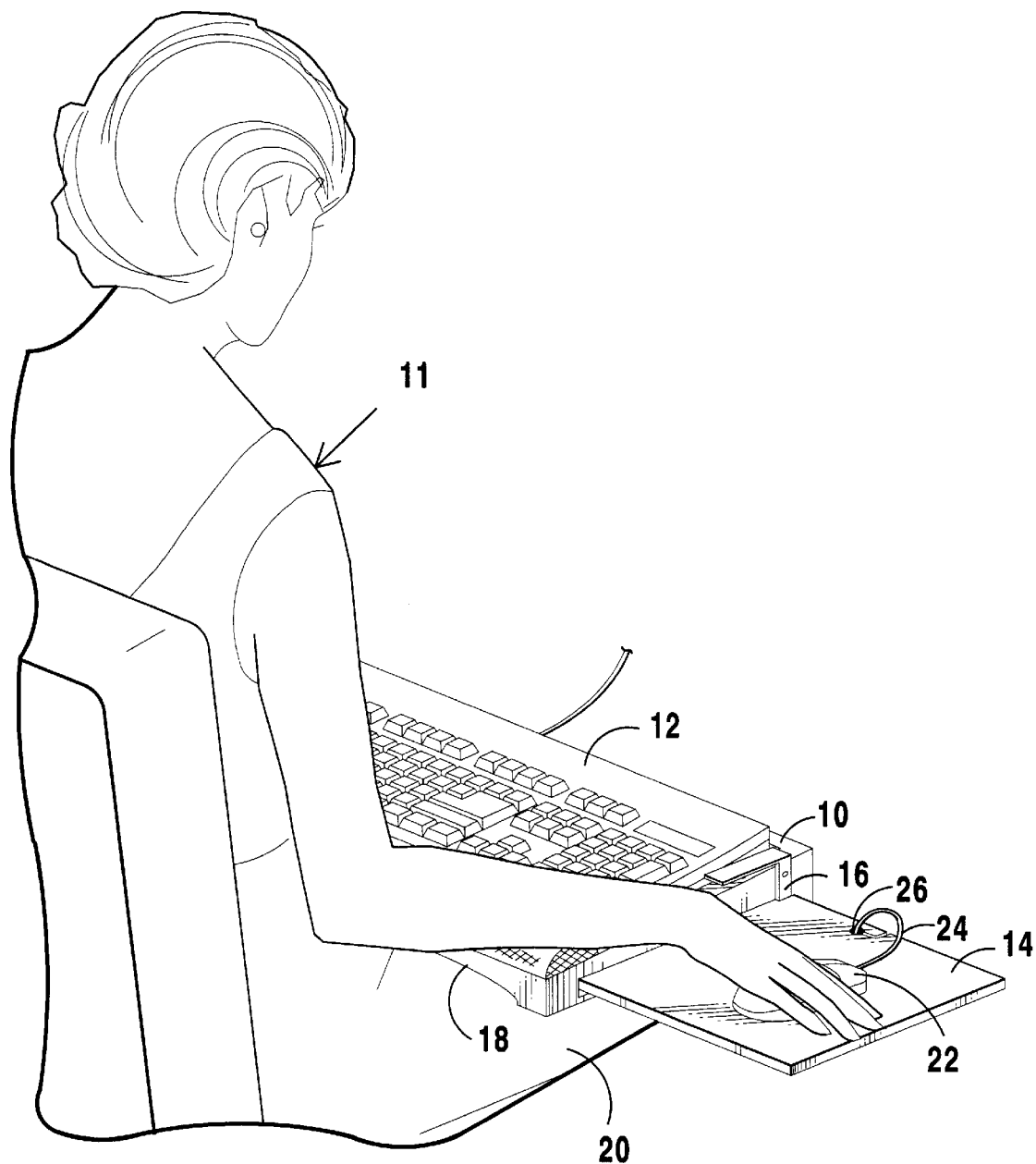
FIG. 1 is a perspective view of the present invention taken in the direction of the arrow labeled 2 in FIG. 1 in use. Shown is the leg contoured lap tray with a keyboard console positioned thereupon with the sideboard fully extended and held in said position by the sideboard clip. Also shown is a pointing device located on the recessed and retractable sideboard with the pointing device wire placed within the sideboard wire slot.

With regard to the referenced numerals, the following numbering is used throughout the various drawings.

10 contoured lap tray 11 user 12 keyboard
14 sideboard
15 sideboard track
16 clip for sideboard
18 leg contoured areas of lap tray
20 legs of user
20 mouse
24 wire for mouse
26 wire hole
28 padded surface of tray
30 recessed top of tray
31 rim of tray
32 notch for clip
33 contoured lip area
34 padded bottom of tray

DESCRIPTION OF THE PREFERRED
EMBODIMENT(S)

Turning to FIG. 1, therein is shown a perspective view of the present invention in use. Shown therein is the leg contoured lap tray 10 sized for use by a human, the user 11, having the keyboard console 12 positioned thereon with the retractable user selectable sideboard 14 fully extended and with said sideboard 14 being held in an extended position by the sideboard clips 16. The leg contoured or recessed areas 18 of the lap tray 10 are also shown fitting over the user's 11 legs 20. Also shown in FIG. 1 is the pointing device or mouse 22 located on the fully extended sideboard with the connecting mouse wire 24 shown passing through the hole or wire slot 26 located on the sideboard.

Figure 2:
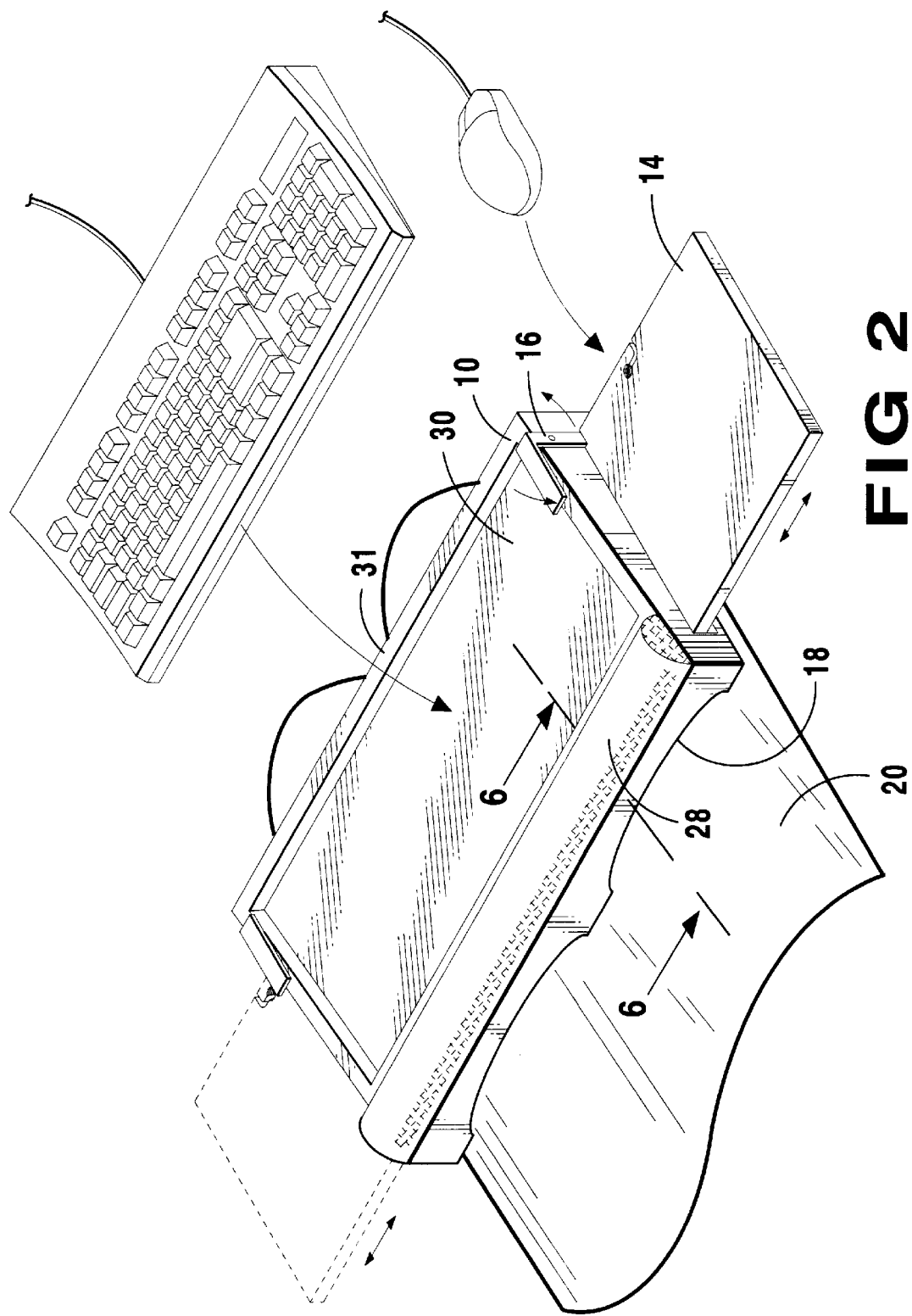
FIG. 2 is a front perspective view of the present invention. Shown is the leg contoured lap tray with the sideboard fully extended on one side and shown in outline when it is reversed and fully extended on the other side.

Turning to FIG. 2, therein is shown a front perspective view of the present invention. Shown therein is the leg contoured lap tray 10 with the user's legs outlined as 20, the extended sideboard 14, extended on one side and shown in outline of where its position would be if it were recessed into the tray 10 and extended outwardly from the opposite end. Also shown therein is the clip 16 for the sideboard along with the leg contoured areas 18 of the lap tray and the user's legs 20. Also shown is the padded area of the rear part of the lap tray 28 upon which the user's forearms rest. Additionally, therein is shown the recessed area of the upper portion or surface of the lap tray 30 having a rim 31 within which the keyboard console is cradled, placed and secured on the upper surface of the contoured lap tray 10.

Figure 3:
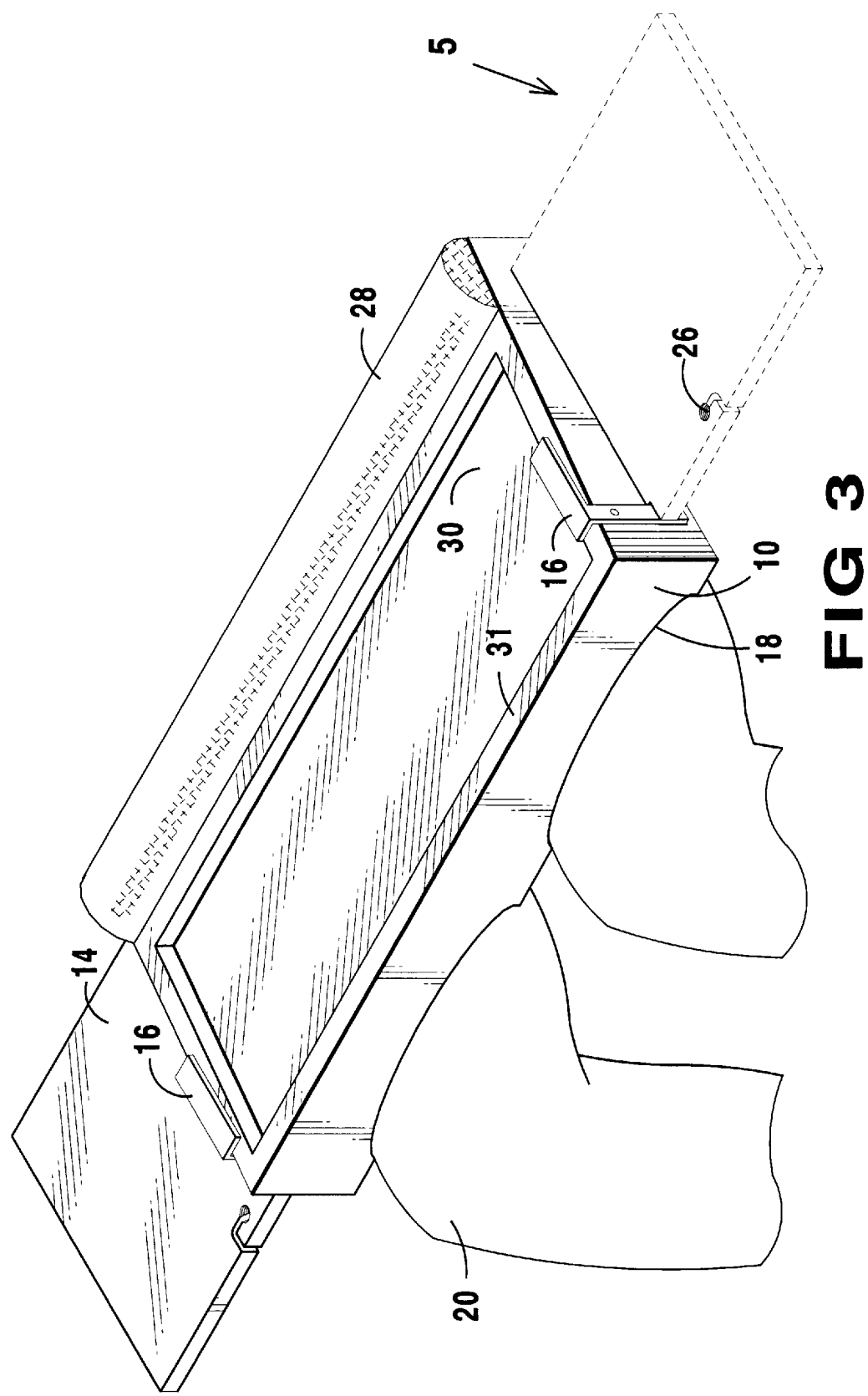
FIG. 3 is a front perspective view, taken from FIG. 2 in the direction of the arrow labeled 3,4 showing the front contoured bottom edge. Also shown is the cord slot for the pointing device and the sideboard fully extended.

Turning to FIG. 3, therein is shown a front perspective view, taken from FIG. 2 as indicated. Shown therein is the leg contoured lap tray 10 with the user's legs outlined as 20, the extended sideboard 14, extended on one side and shown in outline on the opposite end as described above. Also shown therein is the clip 16 for the sideboard along with the leg contoured areas 18 of the lap tray. Also shown is the padded area of the rear part of the lap tray 28 upon which the user's forearms rest. Additionally, therein is shown the recessed area of the upper portion of the lap tray 30 having a rim 31 within which the keyboard console is placed and secured on the upper surface of the contoured lap tray 10 along with the cord slot 26 of the pointing device.

Figure 4:
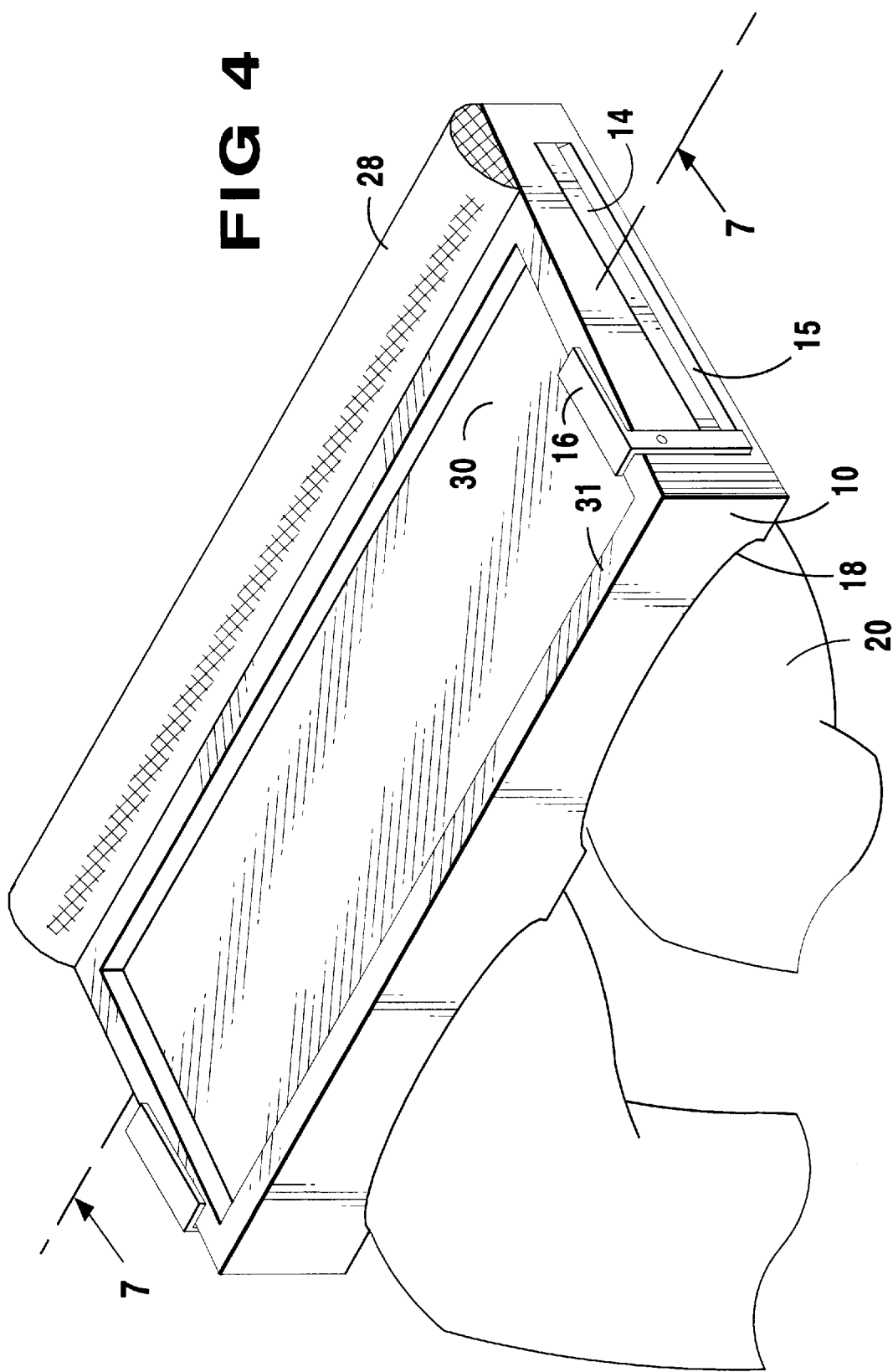
FIG. 4 is a front perspective view, taken from FIG. 2 in the direction of the arrow labeled 3,4 showing the front contoured bottom edge and the sideboard in the fully closed position with the sideboard clip holding the sideboard in the closed position.

Turning to FIG. 4, therein is shown a front perspective view, taken from FIG. 2 as indicated. Shown therein is the leg contoured lap tray 10 with the user's legs outlined 20, the sideboard 14 in the fully closed or retracted position. Also shown therein is the clip 16 holding the sideboard in the closed position along with the leg contoured areas 18 of the lap tray and the user's legs 20. Note the sideboard 14 is about the same width as the lap tray 10 and is slidably mounted in a track or slot 15 on the interior of the tray 10. Also shown is the padded rest 28 of the lap tray 10 upon which the user's forearms rest. Additionally, therein is shown the recessed area of the upper portion of the lap tray 30 being rimmed 31 within which the keyboard console is placed and secured on the upper surface of the contoured lap tray 10.

Figure 5:
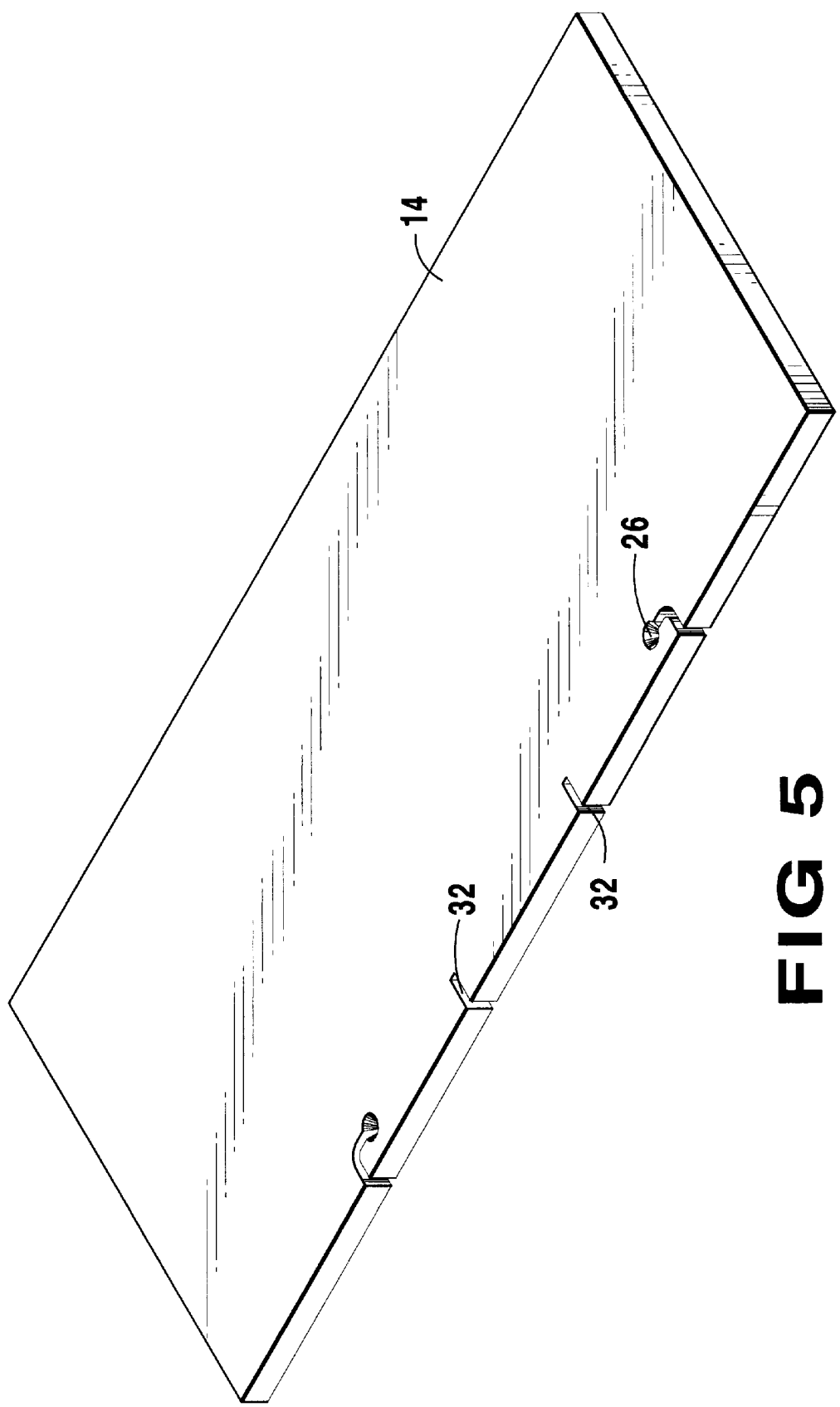
FIG. 5 is a front perspective view of the sideboard, taken from FIG. 4 as indicated, showing the notches where the sideboard clip will snap into when the sideboard is in the fully extended position. Also shown are the slots for the wire of the pointing device.

Turning to FIG. 5, therein is shown a front perspective view of the sideboard 14 taken from FIG. 4 as indicated. Also shown are the wire holes 26 through which the wires for the pointing device pass along with the notches 32 where the sideboard clips snap into and attach themselves into the sideboard when it is in a fully extended position toward either end of the tray 10.

Figure 6:
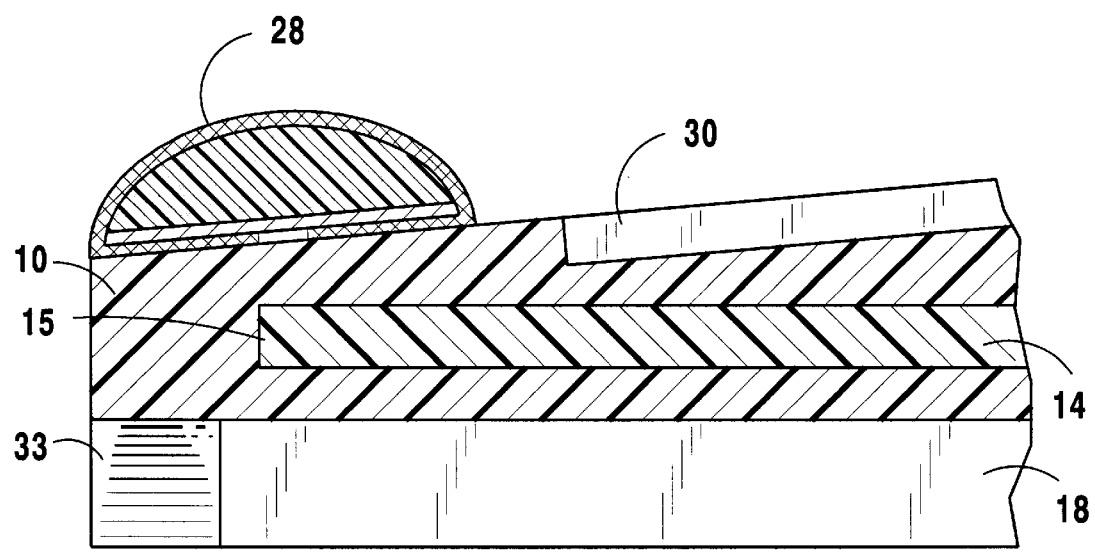
FIG. 6 is a partial cross sectional view, taken from FIG. 2 along the line 6—6, showing the underside contoured lip. Also shown is the padded wrist rest and the recessed portion of the upper surface where the keyboard resides.

Turning to FIG. 6, therein is shown a partial cross sectional view, taken from FIG. 2 as indicated. Shown therein is the lap tray 10, the sideboard 14, the sideboard track 15, the leg contoured area 18 of the tray showing the underside contoured lip 33 with serrations located thereon. Also shown therein is the padded wrist rest 28 along with the recessed portion 30 of the upper surface of the tray 10 wherein the keyboard (not shown) resides.

Figure 7:
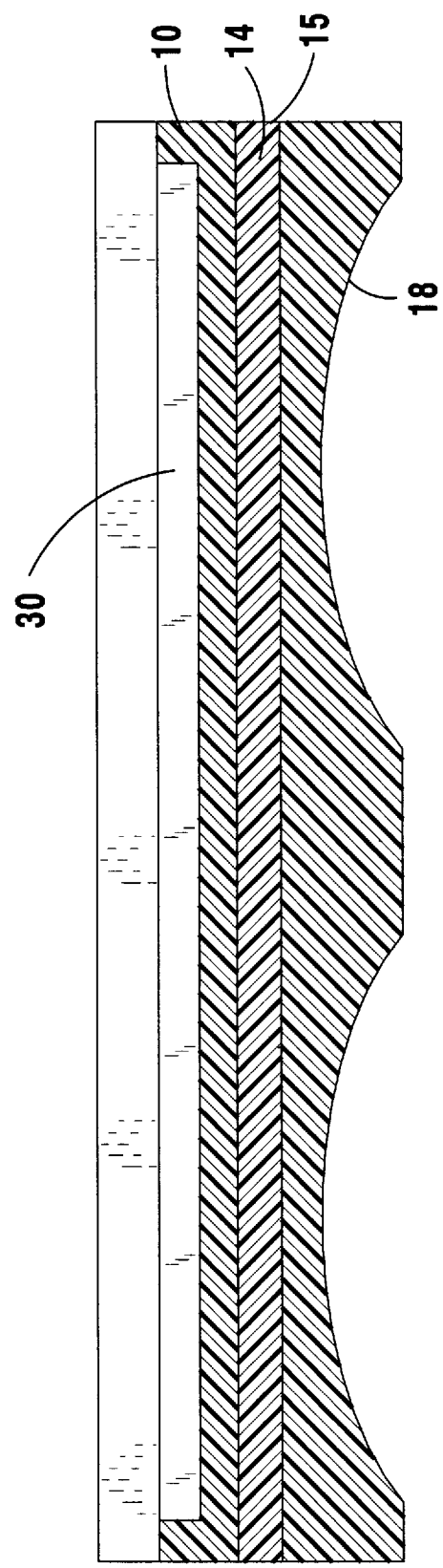
FIG. 7 is a cross sectional view, taken from FIG. 4 along the line 7—7.

Turning to FIG. 7, therein is shown a cross sectional view, taken from FIG. 4 as indicated. Shown therein is the contoured lap tray 10, the sideboard 14 within the sideboard track 15, the leg contoured areas 18 of the lap tray, along with the recessed top of the tray 30.

Figure 8:
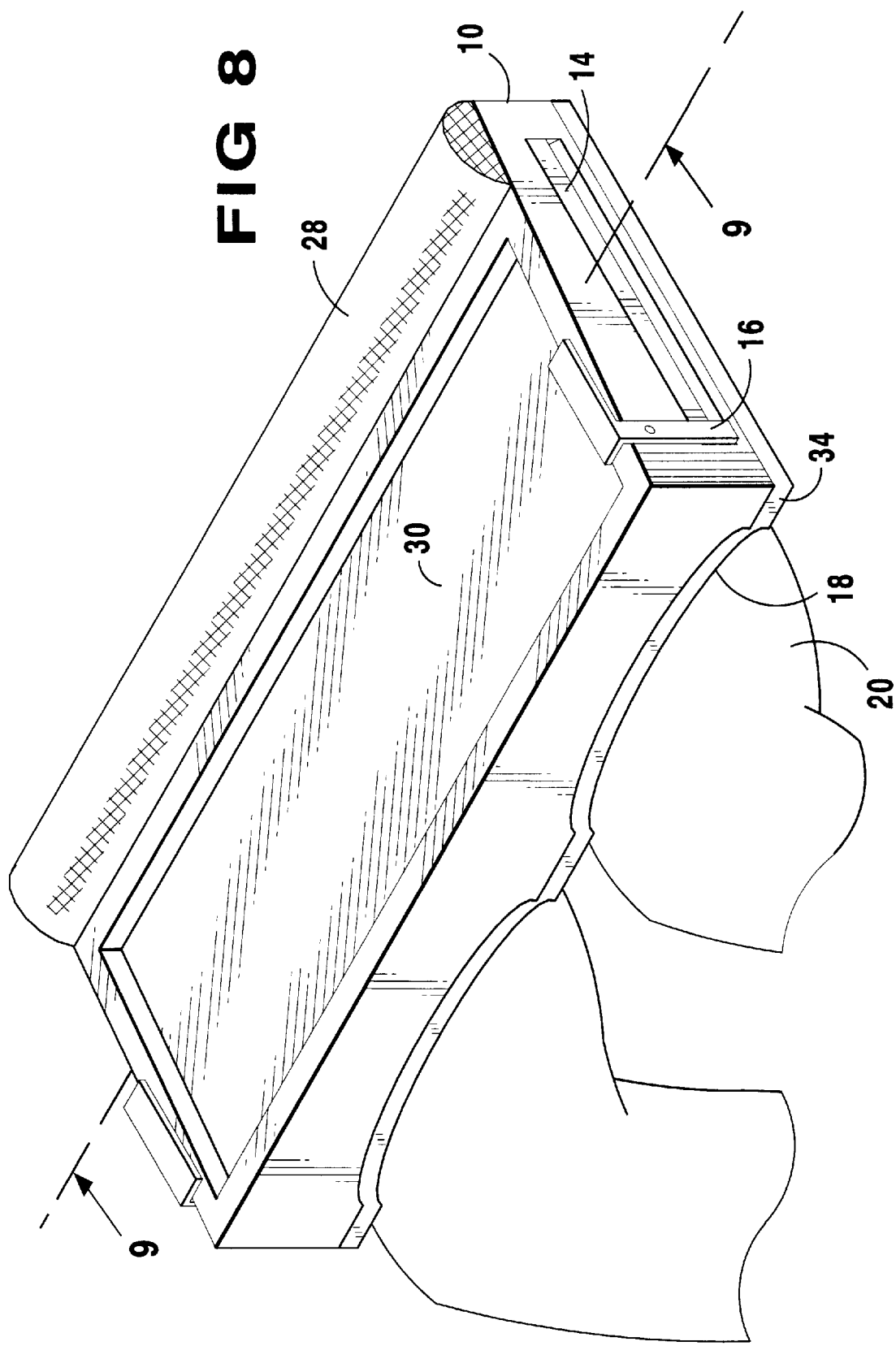
FIG. 8 is a front perspective view of an alternate embodiment of the present invention showing the front contoured padded bottom edge and the sideboard in the fully closed position with the sideboard clip holding the sideboard in the closed position.

Turning to FIG. 8, therein is shown a front perspective view of an alternative embodiment of the present invention equipped with a contoured padded bottom 34 made of foam or like material. Shown therein is the leg contoured lap tray 10 with the user's legs outlined as 20 and sideboard 14. Also shown therein is the clip 16 for the sideboard along with the recessed areas 18 of the lap tray and the user's legs 20. Also shown is the padded area of the lap tray 28 upon which the user's forearms rest. Additionally, therein is shown the recessed area of the upper portion of the lap tray 30 within which the keyboard console is placed and secured on the upper surface of the contoured lap tray 10.

Figure 9:
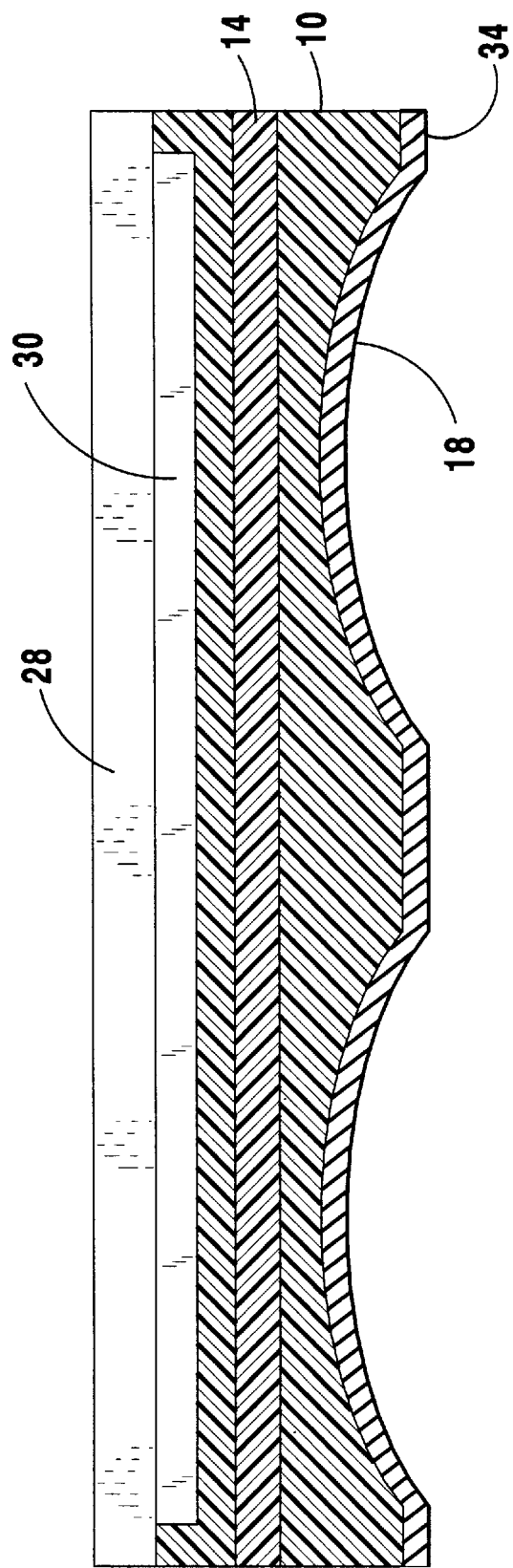
FIG. 9 is a cross sectional view, taken from FIG. 8 along the line 9—9, showing the alternate embodiment of the present invention.

Turning to FIG. 9, therein is shown a cross sectional view, taken from FIG. 8 as indicated, showing the alternative embodiment of the present invention, particularly, the padded bottom of the tray 34. Shown therein is the contoured lap tray 10, the sideboard 14, the leg contoured areas 18 of the lap tray, along with the recessed top of tray 30 and the arm rest 28.

I claim:

1. An apparatus for holding a computer keyboard, comprising:
   a) a lap sized tray for use by a user;
   b) said tray having two contoured areas on its bottom for receiving the legs of the user;
   c) said tray having a rimmed depression in its upper surface for receiving a computer keyboard;
   d) a sideboard slidably mounted on the interior of said tray for being retractably extended from said tray for receiving a pointing device;
   e) said tray having a track on its interior within which said sideboard slidably operates;
   f) said sideboard being notched for receiving a clip whereby said sideboard is secured in position; and,
   g) said tray being equipped with clips on its opposite ends for securely locking said sideboard.

2. The apparatus of claim 1, further comprising said contoured areas of the bottom of said tray having a serrated lip area for being securely positioned onto the lap of the user.

3. The apparatus of claim 1, further comprising a padding material being provided onto the bottom of said tray for being more comfortably utilized by the user.

4. The apparatus of claim 1, further comprising said sideboard having a notch therein for receiving the wire from the pointing device whereby the wire of the pointing device is secured.

5. An apparatus for holding a computer keyboards comprising:
   a) a lap sized tray for use by a user;
   b) said tray having two contoured areas on its bottom for receiving the legs of the user;
   c) said tray having a rimmed depression in its upper surface for receiving a computer keyboard;
   d) said tray having a padded front ridge for receiving the forearms of the user;
   e) a sideboard slidably mounted on the interior of said tray for being retractably extended from said tray for receiving a pointing device;
   f) said tray having a track on its interior with which said sideboard slidably operates;
   g) said sideboard being notched for receiving a clip whereby said sideboard is secured in position; and,
   h) said tray being equipped with clips on its opposite ends for securely locking said sideboard.

6. The apparatus of claim 5, further comprising said contoured areas of the bottom of said tray having a serrated lip area for being securely positioned onto the lap of the user.

7. The apparatus of claim 5, further comprising a padding material being provided onto the bottom of said tray for being more comfortably utilized by the user.

8. The apparatus of claim 5, further comprising said sideboard having a notch therein for receiving the wire from the pointing device whereby the wire of the pointing device is secured.

* * * * *